United States Patent
Pantier et al.

(10) Patent No.: US 7,739,915 B2
(45) Date of Patent: Jun. 22, 2010

(54) REINFORCED ELASTOMERIC DIAPHRAGM

(75) Inventors: David Pantier, Gilbert, AZ (US); Todd Garrod, Gilbert, AZ (US); John Vasquez, Chandler, AZ (US); Paul Banta, Avondale, AZ (US); Dave Tornquist, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 338 days.

(21) Appl. No.: 12/033,152

(22) Filed: Feb. 19, 2008

(65) Prior Publication Data

US 2009/0205431 A1    Aug. 20, 2009

(51) Int. Cl.
*G01L 7/08* (2006.01)
*F16J 3/00* (2006.01)

(52) U.S. Cl. .............................. 73/715; 92/90
(58) Field of Classification Search ............ None
See application file for complete search history.

(56) References Cited

U.S. PATENT DOCUMENTS

| | | | |
|---|---|---|---|
| 2,626,626 A | 1/1953 | Rosenberger et al. | |
| 2,728,095 A | 12/1955 | Kamborian | |
| 2,963,906 A | 12/1960 | Bailey | |
| 3,296,868 A | 1/1967 | Koppel et al. | |
| 3,659,448 A | 5/1972 | Schaus | |
| 3,678,754 A | 7/1972 | Amir et al. | |
| 3,886,968 A | 6/1975 | Murrell | |
| 3,966,263 A | 6/1976 | Thrush | |
| 3,969,991 A * | 7/1976 | Comstock et al. | 92/99 |
| 4,022,114 A | 5/1977 | Hansen, III et al. | |
| 4,297,899 A | 11/1981 | Blaney et al. | |
| 4,361,050 A | 11/1982 | Coussot et al. | |
| 4,987,920 A | 1/1991 | Donner | |
| 5,687,633 A * | 11/1997 | Eady | 92/97 |
| 6,105,608 A | 8/2000 | Katzman | |
| 6,142,062 A * | 11/2000 | Streitman | 92/99 |
| 6,145,430 A * | 11/2000 | Able et al. | 92/93 |
| 6,150,681 A | 11/2000 | Allen | |
| 6,382,585 B1 | 5/2002 | Pubben et al. | |
| 6,554,587 B2 | 4/2003 | Paolini et al. | |

* cited by examiner

*Primary Examiner*—Lisa M Caputo
*Assistant Examiner*—Jermaine Jenkins
(74) *Attorney, Agent, or Firm*—Ingrassia Fisher & Lorenz, P.C.

(57) ABSTRACT

A diaphragm is provided that includes a plurality of zonal portions that define reinforced and non-reinforced areas of the diaphragm. A first zonal portion extends from a marginal edge portion toward a central portion and is formed of a fabric material. A second zonal portion extends from the first zonal portion toward the central portion and is formed of an elastomer. A third zonal portion defines the central portion and is formed of a fabric material. The combination of reinforced and non-reinforced portions provides for a decrease in the radial tension (spring rate) of the diaphragm and helps prevent undesired changes to the flow control valve flow setpoint.

20 Claims, 2 Drawing Sheets

REINFORCED ELASTOMERIC DIAPHRAGM

TECHNICAL FIELD

The present invention relates to flow control valves, and more particularly to a reinforced diaphragm for use in a flow control valve.

BACKGROUND

Flow control valves are typically used to regulate the flow or pressure of a fluid in a device. Flow control valves may be found in various applications such as commercial vehicles and aerospace applications. These types of control valves may respond to signals generated by independent devices that measure the flow and temperature across the valve. Prior art flow control valves generally include a diaphragm having a differential pressure across the diaphragm, wherein movement of the diaphragm controls the flow through the valve member. More specifically, the diaphragm changes shape with inlet pressure changes, thus maintaining a constant flow rate through the valve. Although, these current flow control valves are an improvement over earlier devices due to their simple structure, they may not prevent an undesired change to the flow rate setpoint of the valve when exposed to high temperatures.

A typical flow control valve assembly may include at least a housing, a diaphragm, and a diaphragm support structure. As previously stated, these devices may be short lived when exposed to high temperatures and pressures. Accordingly, the flow control valve assembly may include a sensing device, such as a zero delta-pressure servo sensor, to maintain an approximately zero pounds per square inch differential (psid) across the diaphragm for optimal operation. The zero psid is initially calibrated at room temperature. This initial calibration is such that the diaphragm is stroked to a position away from its natural center. The diaphragm stroke required to calibrate the valve is typically less than 0.100 inches and is thus considered a small stroke application. As the valve body temperature increases, the diaphragm introduces an additional force which upsets the zero delta-pressure balance originally established at room temperature.

In many instances, the diaphragm may be made from a flat sheet of fabric having a number of yarns, and may be coated on at least one side with an elastomer, which is subsequently crosslinked. The diaphragm support structure typically includes two metallic housings that serve to fixedly hold the diaphragm therebetween via a plurality of torqued bolts formed in a pattern about an outer diameter. During the operation of the valve, the diaphragm may be exposed to numerous pressure cycles and increase in operational temperatures. Although presently used diaphragms are robustly designed and operate safely, in some instances the diaphragm may not prevent an undesired change to the flow rate setpoint of the valve when exposed to high temperatures.

One particular type of undesired change to the flow rate setpoint following repeated pressure cycles results from an increase in the radial tension across the diaphragm. More particularly, as the flow control valve body temperature increases, the metallic housing holding the diaphragm in place is subjected to increased temperatures and thermally expands. This thermal expansion of the diaphragm housing increases the outer diameter bolt pattern that is securing the diaphragm. During this situation, the fabric comprising the diaphragm may not allow the diaphragm to stretch in response to the increased outer diameter. This increase in the outer diameter bolt pattern can result in an increase in the radial tension in the diaphragm, thereby introducing a force in the axial direction which is attempting to return the diaphragm to its natural center position. More particularly, the radial stretch is translated into an axial force. This translation of force is known as the radial spring rate in the diaphragm, where in this case with fabric, the spring rate is relatively high. The axial forces can upset the original, calibrated, zero delta-pressure balance and result in an undesired change to the flow rate setpoint of the valve when exposed to high temperatures that may compromise valve performance.

Hence, there is a need for a diaphragm that may be used in a flow control valve that is less prone to producing a high radial spring rate and/or is relatively inexpensive to make and/or reduces maintenance and repair costs associated with diaphragms. The present invention addresses one or more of these needs.

BRIEF SUMMARY

The present invention provides a reinforced elastomeric diaphragm. In one embodiment, and by way of example only, the diaphragm includes a first portion extending inwardly from a marginal edge portion toward a central portion, a second portion coupled to the first portion and extending inwardly from the first portion toward the central portion, and a third portion coupled to the second portion and defining the central portion. The first portion comprising a reinforced material. The second portion comprising a non-reinforced material. The third portion comprising a reinforced material.

In another embodiment, and by way of example only, the diaphragm includes a first zonal portion extending inwardly from a marginal edge portion toward a central portion, a second zonal portion coupled to the first zonal portion and extending inwardly from the first zonal portion toward the central portion, and a third zonal portion coupled to the second zonal portion and defining the central portion. The first zonal portion comprising a fabric material. The second zonal portion comprising an elastomer. The third zonal portion comprising a fabric material.

In still another embodiment, the diaphragm includes A reinforced elastomeric diaphragm comprising a first portion extending inwardly from a marginal edge portion toward a central portion, a second portion coupled to the first portion and extending inwardly from the first portion toward the central portion, and a third portion coupled to the second portion and defining the central portion. The first portion defining a reinforced first zone comprising a fabric material including a plurality of yarns in a woven pattern, wherein the plurality of yarns of the fabric material are formed of at least one of a polyamide (nylon), a fiberglass, or a polyester. The second portion defining a non-reinforced second zone comprising an elastomer of at least one of a silicone, a fluorosilicone, or a fluorocarbon. The third portion defining a reinforced third zone comprising a fabric material including a plurality of yarns in a woven pattern, wherein the plurality of yarns of the fabric material are formed of at least one of a polyamide (nylon), a fiberglass, or a polyester.

Other independent features and advantages of the preferred diaphragm will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
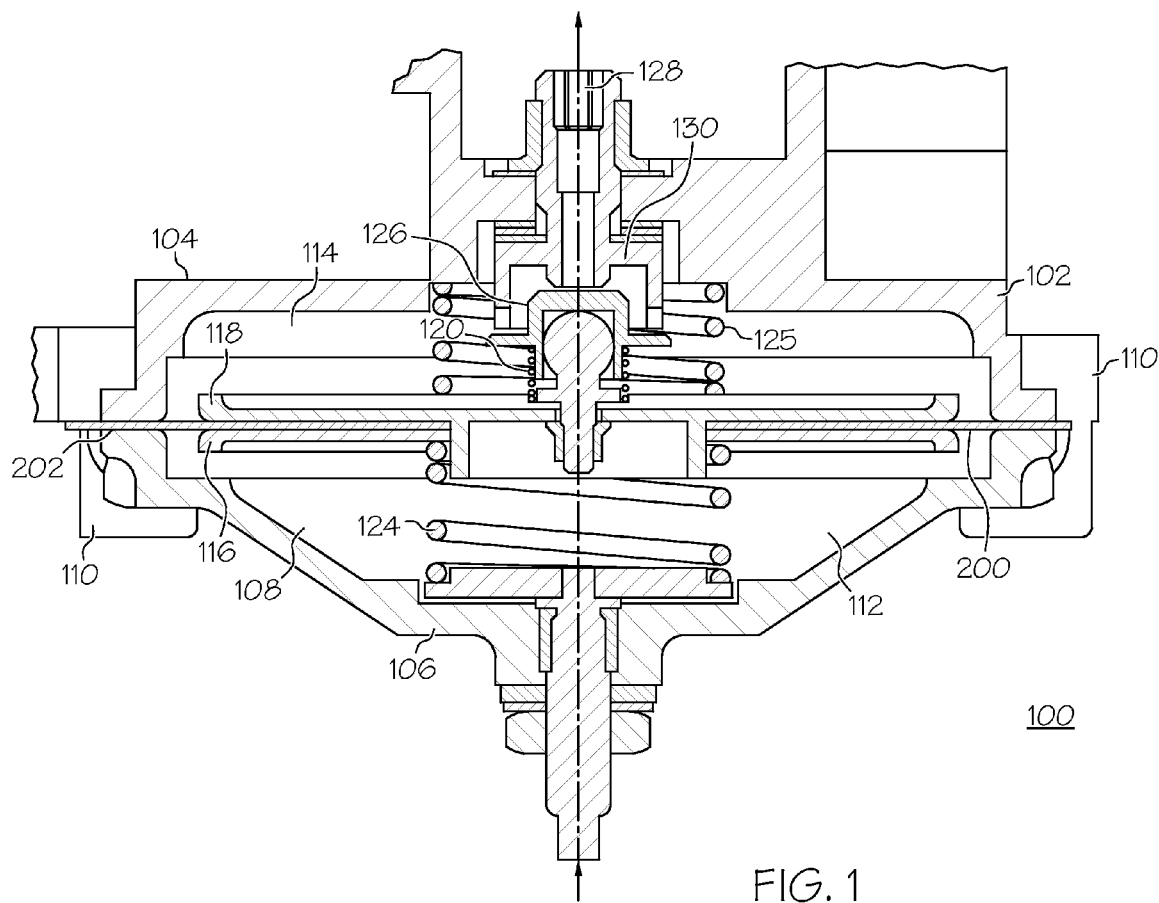
FIG. 1 is a cross sectional view of an exemplary flow control valve that may employ the diaphragm of the present invention.

Turning first to FIG. 1, a cross-sectional view of an exemplary flow control valve 100 that may employ the diaphragm of the present embodiment is shown. In this particular embodiment, the flow control valve 100 is commonly referred to as a zero delta-p servo valve in that the pressure across the diaphragm is approximately zero psid. As this figure illustrates, the flow control valve 100 includes a housing assembly 102 that is made up of an upper housing section 104 and a lower housing section 106. The upper housing section 104 is coupled to the lower housing section 106 to form an internal chamber 108 within the housing assembly 102. The upper 104 and lower 106 housing sections are preferably coupled together by, for example, by a plurality of fasteners 110, such as, for example, torqued nuts and bolts, located around the circumference of the upper 104 and lower 106 housing sections. It will be appreciated that any other suitable structure could be used to couple the housing sections together.

An exemplary diaphragm 200 is mounted within the housing assembly 102. In the depicted embodiment, a peripheral portion of the diaphragm, and more specifically the marginal edge portion 202 is positioned between the upper 104 and lower 106 housing sections, and is thereby clamped in place. It will be appreciated that any one of numerous other suitable structures could be used to clamp the diaphragm 200 in place. With this configuration, the diaphragm 200 divides the internal chamber 108 into at least two portions, a first portion 112 and a second portion 114.

A diaphragm support 116 is mounted below the diaphragm 200 and moves with, and provides support to, the diaphragm 200. In the depicted embodiment, a diaphragm backing plate 118 is positioned over a portion of the diaphragm 200. A threaded stop screw 120 extends through the diaphragm backing plate 118, the diaphragm 200, and the diaphragm support 116, and is threadedly coupled to a push rod 122.

A first spring 124 is mounted within the internal chamber 108 between the diaphragm support 116 and a bottom inside of the lower housing section 106. The first spring 124 is configured to bias the diaphragm support 116 upward (relative to the view in FIG. 1). A second spring 125 is mounted within the internal chamber 108 between the diaphragm backing plate 118 and an upper inside of the upper housing section 104. In the depicted embodiment, the upper housing section 104 and the lower housing section 106 additionally include fluid inlet ports (not shown). The upper housing section 104 includes a fluid outlet port 128. The fluid inlet ports (not shown) and the fluid outlet port 128 are in fluid communication with the internal chamber first portion 112 and the internal chamber second portion 114. The fluid inlet ports (not shown) and the fluid outlet port 128 allow entry and exit of a fluid from an external supply system (not shown). It will be appreciated that any number of fluid inlet and outlet ports and specific configurations could be used in the flow control valve 100.

The flow control valve 100 illustrated in FIG. 1 and described above, is operated by simultaneously supplying a pressurized fluid, such as air or gas, to the fluid inlet ports (not shown) in the upper housing section 104 and the lower housing section 106, which pressurizes the internal chamber first portion 112 and the internal chamber second portion 114. The pressure in the internal chamber second portion 114 is permitted to vent to ambient through the outlet port 128 by way of a poppet 126 and metering seat 130. The differential pressure across the diaphragm 200 ultimately causes the poppet 126 to meter on the metering seat 128 such that the pressures in the internal chamber first portion 112 and the internal chamber second portion 114 are essentially equal (i.e. zero differential pressure). This pressure balance and mechanism appropriately positions a non-illustrated connected component to establish a constant flow rate setpoint through the flow control valve 100. The first spring 124 and the second spring 125 provide stabilization and calibration of the differential pressure across the diaphragm 200 and ultimately the flow rate setpoint of the flow control valve 100.

Figure 2:
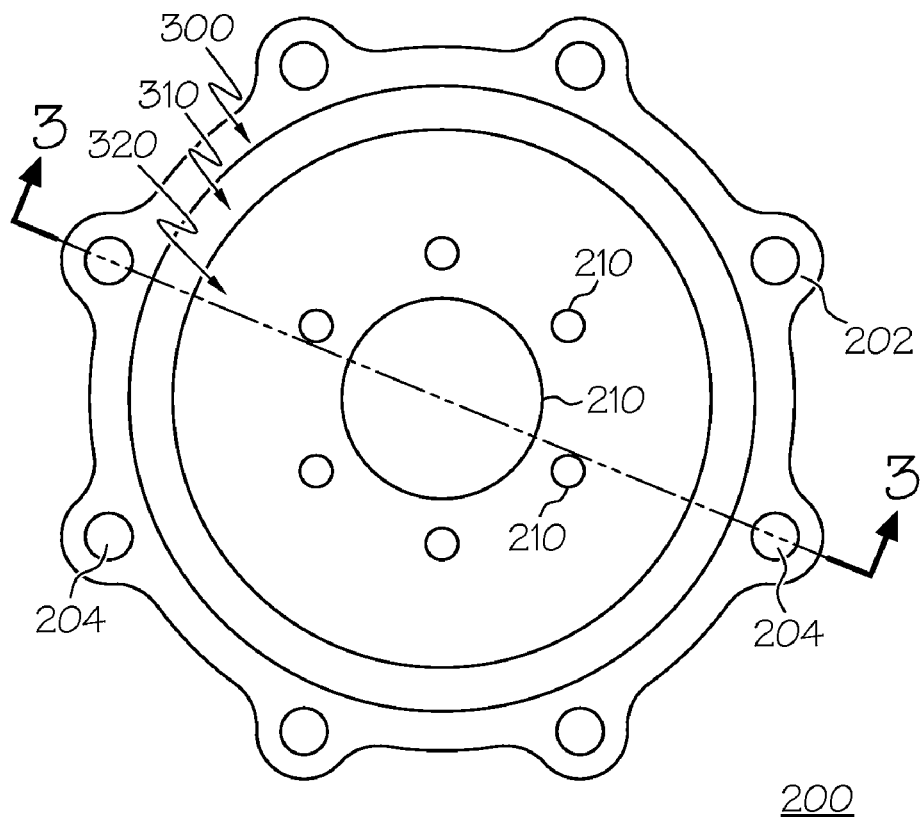
FIG. 2 is a top view an exemplary embodiment of a diaphragm that may be used in the flow control valve depicted in FIG. 1.
Figure 3:
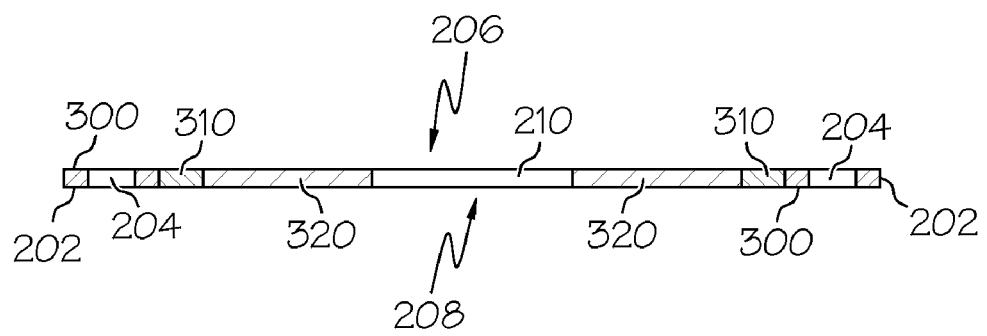
FIG. 3 is a simplified cross-sectional view taken through line 3-3 of FIG. 2, illustrating an exemplary embodiment of a diaphragm that may be used in the flow control valve depicted in FIG. 1.

Turning to FIGS. 2 and 3, a detailed description of an exemplary embodiment of the diaphragm 200 will now be provided. The diaphragm 200 is substantially planar in configuration and has a marginal edge portion 202 sealed between the upper 104 and lower 106 housing sections. More specifically, the diaphragm 200 is fixedly held between the upper 104 and lower 106 housing sections by a plurality of fasteners 110 (FIG. 1). The plurality of fasteners 110, are positioned about a perimeter of the diaphragm 200 and extend through a plurality of aligned thru-holes 204 formed in the diaphragm 200. The diaphragm 200 has opposing sides 206 and 208, defining the first portion 112 and the second portion 114 of the internal chamber 108 of FIG. 1, respectively. A plurality of provisional thru-holes 210 are centrally disposed in the diaphragm 200 thereof and provide for the mounting of additional valve components.

The diaphragm 200 includes a plurality of zonal portions: a first zonal portion 300, a second zonal portion 310, and a third zonal portion 320. The first zonal portion 300 is generally comprised of a fabric-reinforced region that in this particular embodiment is stationary and mounted between the upper 104 and lower 106 housing sections via the plurality of fasteners 110 (FIG. 1). More specifically, the first zonal portion 300 of the diaphragm 200 is made of a fabric that includes a plurality of yarns that are woven into pattern wherein at least one yarn is crossed over a second yarn at an angle. The second zonal portion 310 of the diaphragm 200 is generally comprised of an elastomer. More specifically, the second zonal portion 310 is formed as a non-reinforced region that will experience stretching during operation of the diaphragm 200. This stretching will effectively reduce the radial spring rate of the diaphragm 200 in this region, and more particularly in the second zonal portion 310, from that of a configuration which would normally have fabric-reinforcement. The reduction in diaphragm radial spring rate results in less translated axial force as the upper 104 and lower 106 housing sections thermally expand. This reduces the impact on the zero delta-pressure servo balance. The third zonal portion 320 is comprised of a fabric-reinforced region, similar to the first zonal portion 300, and is used for mounting critical operating components which move relative to the upper 104 and lower 106 housing sections. The diaphragm 200 is therefore reinforced with fabric in the first zonal portion 300 and the third zonal portion 320 resulting in an increase in durability and reinforcement during manufacturing and assembly. The second zonal portion 310 is formed without any fabric reinforcement, and thus provides higher flexibility. In contrast to prior art diaphragm configurations, the diaphragm 200 does not include fabric reinforcement throughout the entire diaphragm 200.

The fabric that forms the first zonal portion 300 and the third zonal portion 320 may alternatively include additional properties that increase its structural integrity. In one exemplary embodiment, the fabric has a yarn count of 50 yarns per square inch or greater. In another exemplary embodiment, each yarn that comprises the fabric may be formed of a bundle of fibers, for example, three fibers that are twisted at an angle. It will be appreciated that each yarn may include fewer or many more fibers. The yarns of the fabric may be made of any suitable material such as, for example, polyamide (nylon), fiberglass, or polyester. However, the fabric is preferably constructed of an aromatic polyamide (e.g. Nomex®). It will be appreciated, however, that various other different materials, and combinations of different materials, may also be used.

The second zonal portion 310 is formed of an elastomer such as silicone, fluorosilicone, or fluorocarbon, although other suitable materials may be used. However, in the preferred embodiment, the elastomer is vinyl methyl silicone (VMQ) that exhibits enhanced heat resistance. More specifically, the preferred elastomer is a vinyl methyl silicone material that is heat resistance enhanced with a fine iron oxide powder (preferably less than 1%), which acts as an antioxidant, and Silastic® HT-1, a heat stability additive available from Dow Corning, in conjunction with a high temperature catalyst 2,5dimethyl-2,5-di-(t-butyl peroxy) which may be purchased under the trademark Varox® DBPH-50, and which is available from the R. T. Vanderbilt Co. It will be appreciated that an optional second layer of elastomer may be coated over the first elastomer layer to thereby strengthen the fabric. The first and second elastomer layers may or may not be similar material. It should be understood that while examples of materials are described above, the specific types and grades of fabric and elastomer that are used to form the diaphragm 200 are application-specific to suit the appropriate operating environment.

It will be appreciated that although the diaphragm 200 is depicted and described herein as being constructed of a single diaphragm structure, it could also be constructed of two or more diaphragms, if so desired for a particular application.

The diaphragm 200 may be installed into a new flow control valve 100, as part of its initial manufacturing process, or the diaphragm could be retrofitted into an existing valve. For example, to retrofit an existing flow control valve 100, an operator would decouple the upper housing section 104 from the lower housing section 106 by removing the plurality of fasteners 110. The threaded stop screw 120 may then be removed, to allow the diaphragm backing plate 118 and existing diaphragm to be removed from the housing assembly 102. The diaphragm 200 (which may include one or more individual diaphragms) may then be installed, and the diaphragm backing plate 118 and the threaded stop screw 120 replaced. The upper housing section 104 may then be coupled to the lower housing section 106.

The diaphragm 200 significantly reduces the likelihood of an undesired change in the flow rate setpoint of the valve 100 due to the partial reinforcement of the diaphragm 200. More specifically, the inclusion of both reinforced and non-reinforced zones within the diaphragm 200 provides for a decrease in the radial tension (spring rate) of the diaphragm 200, and therefore less damaging axial forces.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A diaphragm comprising:
a first portion extending inwardly from a marginal edge portion toward a central portion, the first portion comprising a reinforced material;
a second portion coupled to the first portion and extending inwardly from the first portion toward the central portion, the second portion comprising a non-reinforced material; and
a third portion coupled to the second portion and defining the central portion, the third portion comprising a reinforced material.

2. A diaphragm as claimed in claim 1, wherein the reinforced material is a fabric material having a plurality of yarns in a woven pattern.

3. A diaphragm as claimed in claim 2, wherein the woven pattern comprises at least a first yarn crossed over a second yarn at an angle.

4. A diaphragm as claimed in claim 2, wherein the fabric material comprises at least a first pair of yarns crossed over a second pair of yarns at an angle.

5. A diaphragm as claimed in claim 2, wherein the fabric material has a yarn count of at least 50 yarns per square inch.

6. A diaphragm as claimed in claim 2, wherein the plurality of yarns of the fabric material are formed of at least one of a polyamide (nylon), a fiberglass, or a polyester.

7. A diaphragm as claimed in claim 6, wherein the fabric material is formed of an aromatic polyamide.

8. A diaphragm as claimed in claim 1, wherein the non-reinforced material is an elastomer.

9. A diaphragm as claimed in claim 8, wherein the elastomer is at least one of a silicone, a fluorosilicone, or fluorocarbon 10. A diaphragm as claimed in claim 9, wherein the elastomer is vinyl methyl silicone (VMQ).

11. A diaphragm as claimed in claim 10, wherein the elastomer is a vinyl methyl silicone material and includes an iron oxide powder, Silastic® HT-1, and a high temperature catalyst 2,5dimethyl-2,5-di-(t-butyl peroxy).

12. A diaphragm comprising:
a first zonal portion extending inwardly from a marginal edge portion toward a central portion, the first zonal portion comprising a fabric material;
a second zonal portion coupled to the first zonal portion and extending inwardly from the first zonal portion toward the central portion, the second zonal portion comprising an elastomer; and
a third zonal portion coupled to the second zonal portion and defining the central portion, the third zonal portion comprising a fabric material.

13. A diaphragm as claimed in claim 12, wherein the fabric material includes a plurality of yarns in a woven pattern wherein at least a first yarn crosses over a second yarn at an angle.

14. A diaphragm as claimed in claim 13, wherein the fabric material has a yarn count of at least 50 yarns per square inch.

15. A diaphragm as claimed in claim 13, wherein the plurality of yarns of the fabric material are formed of at least one of a polyamide (nylon), a fiberglass, or a polyester.

16. A diaphragm as claimed in claim 15, wherein the fabric material is formed of an aromatic polyamide.

17. A diaphragm as claimed in claim 12, wherein the elastomer is at least one of a silicone, a fluorosilicone, or a fluorocarbon.

18. A diaphragm as claimed in claim 17, wherein the elastomer is vinyl methyl silicone (VMQ).

19. A reinforced elastomeric diaphragm comprising:
- a first portion extending inwardly from a marginal edge portion toward a central portion, the first portion defining a reinforced first zone comprising a fabric material including a plurality of yarns in a woven pattern, wherein the plurality of yarns of the fabric material are formed of at least one of a polyamide (nylon), a fiberglass, or a polyester;
- a second portion coupled to the first portion and extending inwardly from the first portion toward the central portion, the second portion defining a non-reinforced second zone comprising an elastomer of at least one of a silicone, a fluorosilicone, or a fluorocarbon; and
- a third portion coupled to the second portion and defining the central portion and a reinforced third zone comprising a fabric material including a plurality of yarns in a woven pattern, wherein the plurality of yarns of the fabric material are formed of at least one of a polyamide (nylon), a fiberglass, or a polyester.

20. A diaphragm as claimed in claim 19, wherein the fabric material is formed of an aromatic polyamide and the elastomer is vinyl methyl silicone (VMQ).

* * * * *